United States Patent
Vinati et al.

(10) Patent No.: US 11,820,497 B2
(45) Date of Patent: Nov. 21, 2023

(54) ROTOR WING AIRCRAFT WITH PROPULSION APPARATUS ON ROTATING POLE

(71) Applicant: VINATI S.R.L., Nave (IT)

(72) Inventors: Felice Vinati, Nave (IT); Giacomo Vinati, Nave (IT); Matteo Vinati, Nave (IT); Mariachiara Vinati, Nave (IT); Samuele Vinati, Nave (IT)

(73) Assignee: VINATI S.R.L., Nave (IT)

( * ) Notice: Subject to any disclaimer, the term of this patent is extended or adjusted under 35 U.S.C. 154(b) by 183 days.

(21) Appl. No.: 16/483,928

(22) PCT Filed: Aug. 3, 2018

(86) PCT No.: PCT/EP2018/071196
§ 371 (c)(1),
(2) Date: Aug. 6, 2019

(87) PCT Pub. No.: WO2019/063169
PCT Pub. Date: Apr. 4, 2019

(65) Prior Publication Data
US 2020/0094951 A1    Mar. 26, 2020

(30) Foreign Application Priority Data

Sep. 28, 2017  (IT) .......................... 102017000108804

(51) Int. Cl.
*B64C 27/18*    (2006.01)
*B64C 27/10*    (2023.01)
*B64D 27/24*    (2006.01)

(52) U.S. Cl.
CPC .............. *B64C 27/18* (2013.01); *B64C 27/10* (2013.01); *B64D 27/24* (2013.01)

(58) Field of Classification Search
CPC ......... B64C 27/10; B64C 27/18; B64C 27/24; B64C 27/08; B64C 27/16; B64C 27/22;
(Continued)

(56) References Cited

U.S. PATENT DOCUMENTS 1,955,921 A * 4/1934 Kusse ..................... B64C 27/16
                                                          244/17.11
2,369,652 A * 2/1945 Avery ..................... B64C 27/82
                                                          244/76 R
(Continued)

FOREIGN PATENT DOCUMENTS

DE     202015001341 U1    2/2016
FR          804408 A      10/1936
(Continued)

OTHER PUBLICATIONS

Machine Translation, DE202015001341, 2021.*
(Continued)

*Primary Examiner* — Joshua J Michener
*Assistant Examiner* — Colin Zohoori
(74) *Attorney, Agent, or Firm* — Lucas & Mercanti, LLP

(57) ABSTRACT

A rotor wing aircraft provided with a propulsion apparatus is disclosed. The aircraft has a rotating mast configured to rotate said rotor wing and the apparatus includes a pole mechanically connectable to the rotating mast of the aircraft. At one of the ends of the pole there is placed an electric turbine, powered by a battery, and configured to rotate the pole around an axis of the rotating mast in such a way that the rotation of the pole can be used to rotate the rotor wing. Preferably the pole is made of carbon fiber.

8 Claims, 2 Drawing Sheets

(58) Field of Classification Search
CPC ....... B64C 27/027; B64C 27/04; B64C 27/82; B64C 11/46
See application file for complete search history.

(56) References Cited

U.S. PATENT DOCUMENTS

| | | | |
|---|---|---|---|
| 2,771,255 A * | 11/1956 | Young | B64C 27/16 244/49 |
| 2,944,610 A | 7/1960 | Gluhareff | |
| 3,623,824 A | 11/1971 | Wilde et al. | |
| 5,297,759 A | 3/1994 | Tilbor et al. | |
| 8,764,397 B1 | 7/2014 | Wittig | |
| 2006/0231677 A1 | 10/2006 | Zimet et al. | |
| 2017/0349273 A1* | 12/2017 | Parsons | B64C 27/82 |
| 2019/0375495 A1* | 12/2019 | Pfammatter | B64C 27/28 |

FOREIGN PATENT DOCUMENTS

| | | |
|---|---|---|
| FR | 1011478 A | 6/1952 |
| FR | 2600303 A1 | 12/1987 |
| GB | 612189 A | 11/1948 |

OTHER PUBLICATIONS

Machine Translation, DE202015001341 (Year: 2022).*
International Search Report and Written Opinion for International Application No. PCT/EP2018071196. (14 Pages) (dated Sep. 17, 2018).
Italian Search Report for Corresponding Italian Application No. IT 201700108804. (3 Pages) (dated Apr. 24, 2018).

* cited by examiner

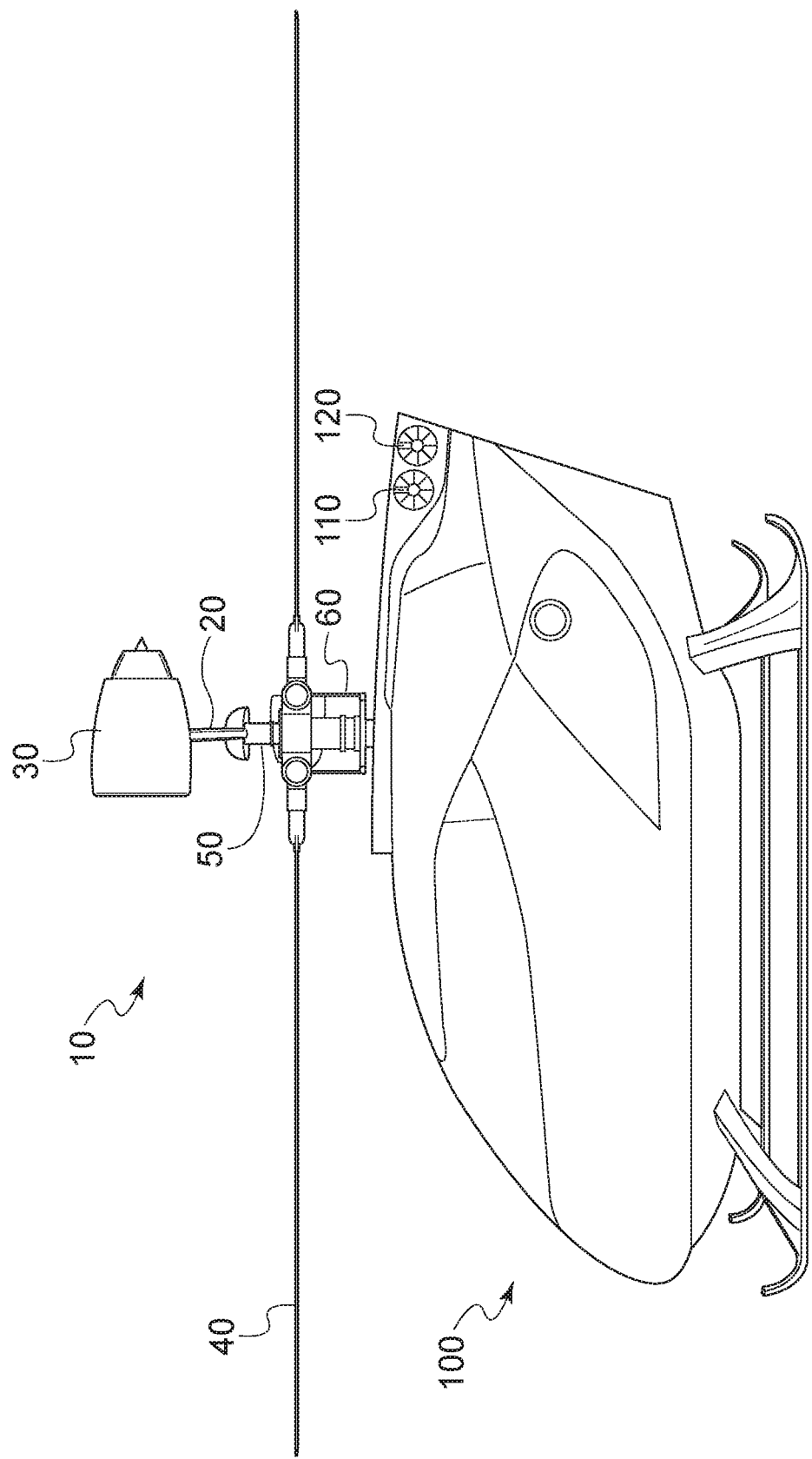

ROTOR WING AIRCRAFT WITH PROPULSION APPARATUS ON ROTATING POLE

CROSS-REFERENCE TO RELATED APPLICATIONS

This application is a 371 of PCT/EP2018/071196, filed Aug. 3, 2018, which claims the benefit of Italian Patent Application No. IT 102017000108804, filed Sep. 28, 2017.

FIELD OF THE INVENTION

The present invention concerns a propulsion apparatus, in particular for a rotary wing aircraft, as well as a rotary wing aircraft provided with said propulsion apparatus. The same apparatus may also be used in fields other than aeronautics, in particular in the field of power generation.

TECHNOLOGICAL BACKGROUND

Several different propulsion systems for rotary wing aircraft, such as helicopters, are known.

In particular, propulsion systems applied to the ends of the blades of the rotating wing have already been tested, but these presented problems of interference with the collective cyclic apparatus of the means to which they were applied.

Known propulsion systems of this type include primarily the so-called cold jet or tip jet system.

Developed by French technicians, the apparatus included a turbine installed solely for the purpose of producing high-pressure air to be conveyed through the mast, namely the shaft of the rotating wing, and then with a complex system, through the helicopter blade to the end of the same where there was a nozzle from which air came out, thus setting the blades in motion and allowing flight.

The cold jet system was abandoned because the jet of air coming out at the ends of the blades produced considerable problems when the pitch of the blade was acted upon, namely when the blade varied angle to create lift. At that time, the propulsion jet pushed the blades upwards.

Imagine then when the cyclic control was activated with which the blade continuously changes its pitch and then the jet produced an oscillating thrust as a function of the inclination of the cyclic pitch.

Also, this jet prevented almost totally the tilt of the blade (movement along the vertical axis of the mast) being always "pushing" and never free to tilt.

This is true of the flapping movement, which was influenced by the thrust jets.

This project dates back to the early '50s and has been abandoned. There was no benefit in terms of vehicle weight, flight duration, payload.

The only advantage was the absence of the main rotor, of the tail rotor and of the freewheel, this in view of the fact that the mast was free and there were no torque problems when transmitting the motion.

Another system that has been tried and tested in the past is the so-called hot jet system.

This system included ramjets installed at the end of the helicopter blades.

The hot jet system, although simpler than the cold jet, produces the same problems because since the ramjets are placed at the ends of the blades it produces significant drawbacks mentioned above: alteration of the blade pitch, cyclic, tilting and flapping.

To these problems it must be added the problem of consumption, which makes it absolutely impossible to fly for more than 20-30 minutes with very high consumption.

All the other existing propulsion systems are connected directly to the mast via the rotor—crown/sprocket, thus having to provide a required power significantly higher than the invention A purpose of the present invention is to overcome the problems of the known art, in particular given by the propulsion systems applied to the ends of the blades of the rotary wing, with a solution that at the same time allows savings in terms of weight of the aircraft. Another purpose of the invention is to create a rotary wing aircraft that allows reduced costs compared to existing aircrafts.

SUMMARY OF THE INVENTION

These and other purposes, which will be evident from reading this description, are achieved by a propulsion apparatus for a rotor wing aircraft, said aircraft comprising a rotating mast configured to rotate said rotor wing, said apparatus being characterized by comprising a pole mechanically connected to the rotating mast of the aircraft, wherein at one of the ends of said pole there is placed a motor configured to rotate the pole in such a way that the rotation of the pole can be used to rotate the rotor wing.

An advantage of this realization is that, since the motor is configured to put into rotation the pole and to transmit such movement of rotation to the blades of the rotating wing, it is not necessary to use a traditional motor.

In addition, it is not necessary to use the main rotor, the tail rotor or the freewheel, since the mast is free and there are no torque problems when transmitting motion.

Another big advantage is a considerable reduction in the weight of the vehicle.

According to an embodiment of the invention, the motor or motors used are electric turbines, also named in the following as e-fan. According to alternative embodiments of the invention, the motor or motors used are jet motors or a propeller motors or a turboprops.

The invention further comprises a rotor wing aircraft provided with a propulsion apparatus, wherein said aircraft comprises a rotating mast configured to rotate said rotor wing, said apparatus being characterized by comprising a pole mechanically connectable to the rotating mast of the aircraft, wherein at one of the ends of said pole there is placed an electric turbine, powered by a battery, and configured to rotate the pole around an axis of the rotating mast in such a way that the rotation of the pole can be used to rotate the rotor wing.

In particular, therefore, it is provided a pole driven by electric turbines is foreseen and the electric turbines are in turn driven by batteries placed on board the aircraft itself.

According to an embodiment of the invention, at an opposite end of the pole with respect to the end to which the motor is applied, a counterweight is placed.

According to another embodiment of the invention, the pole is shaped in such a way as to avoid creating lift when put into rotation.

According to another embodiment of the invention, the pole is made of carbon fiber or other materials of new conception.

Further characteristics of the invention can be deduced from the dependent claims.

BRIEF DESCRIPTION OF THE FIGURES

Further characteristics and advantages of the invention will be evident from the reading of the following description provided as an example and not limited to, with the help of the attached figures, in which:

FIG. 2 schematically shows a realization of a rotary wing aircraft according to an embodiment of the invention

DETAILED DESCRIPTION OF THE FIGURES

Figure 1:
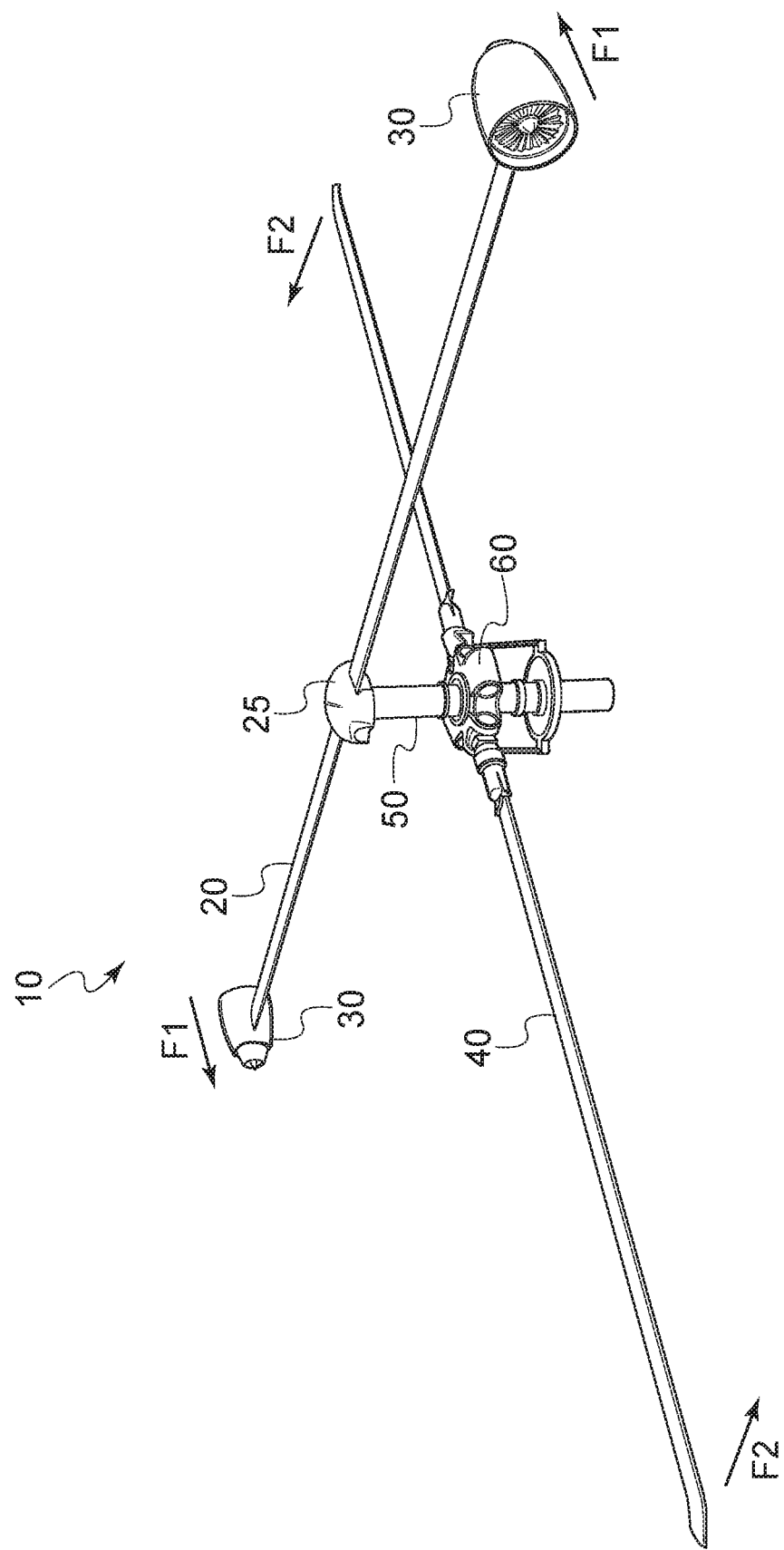
FIG. 1 schematically shows a realization of the propulsion apparatus for rotary wing aircraft according to an embodiment of the invention.

FIG. 1 outlines a realization of the propulsion apparatus applicable to rotary wing aircraft, according to an embodiment of the invention, and globally indicated with the numerical reference 10.

In general, the propulsion apparatus for a rotary wing aircraft of the invention is associated with a rotating mast 50 mechanically connected to said rotating wing 40.

Generally speaking, in this description, with rotary wing aircraft it is intended an aircraft heavier than air which uses lift generated by particular wing surfaces, called blades, rotating around a shaft.

The propulsion apparatus 10 comprises a pole 20, mechanically connectable in a selective way to the rotating mast 50 of the aircraft 100, where at least one end of that power pole is applied an engine 30 configured to put into rotation the pole 20.

Preferably, at each of the two ends of pole 20 attached to the rotating mast 50 of the aircraft 100 an engine 30 is applied, where each of the engines 30 contributes to provide a rotating torque for the rotation of the rotating mast 50 of the aircraft 100.

Motors may be, for example, electric turbines powered by batteries onboard of the rotary wing aircraft 100.

In the case of electric motors, it is possible to provide electrical connection and power supply cables passing inside pole 20.

Alternatively, the engines 30 may be jet engines or propeller or turboprop engines.

In all those cases in which it is necessary to provide fuel to the engines, it is possible to provide channels for fuel flow obtained inside the pole 20.

In a variant of the invention (not represented for simplicity), a counterweight is placed at the opposite end of pole 20 attached to the rotating mast 50 of the aircraft to which the engine is applied, for example an electric turbine 30.

In another variant of the invention, pole 20 is mechanically connected directly to the rotating mast 50 of the aircraft 100 by a rigid joint 25.

Alternatively, pole 20 is mechanically connected to the rotating mast 50 of the aircraft 100 by a semi-rigid or articulated joint.

In general, the rotation of pole 20 takes place in a different plane with respect to the plane of rotation of the rotary wing 40.

In general, the rotation of pole 20 takes place around an axis perpendicular to the longitudinal axis of the pole itself.

In particular, the point of attachment of the pole to the rotating mast 50 of the aircraft 100 may be placed above or below the steering system of the aircraft, e.g. above (as in the example in FIG. 1) or below the aircraft's collective swash plate and oscillating system 60.

Note that the collective swash plate and the oscillating system 60 of the aircraft 100 is of known type and is controlled by the pilot in a manner known in the art.

The shape of pole 20 can be any with the caveat that pole 20 should not create significant lift during its rotation.

Alternatively, pole 20 can also be constructed with a shape that can creates lift when rotated, such as a sufficient lift for vertical takeoff.

Preferably, pole 20 is made of carbon fiber.

The propulsion system as shown in FIG. 1 differs substantially from those illustrated in the introduction and known in the art.

The propulsion system is not applied to the ends of the blades of the vehicle and constitute the flight system as in the cases mentioned in the preamble.

In fact, the propulsion system that is an object of the present invention consists of a pole 20 (also named power rod) of adequate size applied solidly to the shaft or mast of the helicopter or other vertical take-off aircraft and it is completely independent from the blades of the same.

The mast no longer has the rotor but rotates freely on a suitable support (thrust bearing or other) driven by the engine or engines at the ends.

During operation of propulsion apparatus 10, the motors 30 generate a rotational torque indicated by the arrows F1 in FIG. 1 and, by virtue of the connection to the rotating mast 50, generate a corresponding rotation of the rotating wing 40 according to the direction indicated by the arrows F2.

FIG. 2 schematically shows a rotary wing aircraft 100 according to an embodiment of the invention.

In this embodiment, the aircraft 100 is provided with two electric fans (e-fans) 110, 120 that can be controlled by using the pedals to allow a rotation up to 360° on the yaw axis.

An on-board computer, using a system trim, controls the direction in which the helicopter heading is pointed.

By way of a non limitative example, the length of the rotary wing 40 of the aircraft 100 can be 9030 mm and the size of the pads can be 5530 mm.

The propulsion system 10 according to the various embodiments of the invention offers the following advantages:

1—reduction of the power required for flight: in fact, exploiting the lever effect, the power required at the end of the rotating pole 20 is reduced, compared to the power required to be applied on the axis of the rotating mast, to a considerable extent due to the distance between the propeller applied at the end of the pole 20 and the center of the rotating mast 50.

However, it is necessary to calculate the necessary thrust using the formula of general validity $P.L.=38 \times \eta/\sqrt{(D.L.)}$ where:

P.L.=Power Loading Kg/HP

D.L.=Disc Loading Kg/m2

η=Aerodynamic efficiency of the selected engines.

Once the MTOW (Maximum Take Off Weight) has been defined, the necessary thrust of the engines can be deduced.

2—contrary to propulsion systems already tested and illustrated in the introduction, the invention makes the propulsion system independent from the cyclic-collective system of the blades.

In fact, the invention is applied integrally to the rotating mast 50 of the aircraft of which it is the motor system.

Therefore, in the present case, the propulsion system 10 is separated from the cyclic, collective, flapping and tilting system; the latter are of the traditional type and continue to perform their original function without interference from the propulsion system.

3—the invention allows to eliminate the classic engines, whether they are traditional or turbine, installed to generate the rotary motion of the mast.

4—the invention allows to eliminate the main rotor (sprocket-crown).

5—the invention allows to eliminate the free wheel necessary to the traditional means in order to allow the autorotation.

6—the invention allows to eliminate the tail rotor as there is no "torque" effect which, in traditional solutions, is generated by the main rotor, the pinion and the crown. Consider that the tail rotor alone absorbs about 8% of the maximum power calculated for the hovering of the helicopter.

This means considerable energy savings and a significant reduction in installed power.

This means an increase in the payload (passengers or fuel or batteries).

7—the invention allows to eliminate the tail of the helicopter replacing it with a small drift or with a small electric motor with blades or both.

8—the invention allows a very efficient autorotation considering that the propellers applied to the end of the pole increase in a considerable way the inertial mass.

9—the invention avoids the problem of entering into autorotation since the rotating mast turns freely and the entrance into autorotation is in fact automatic; the shutdown of the propellers allows however the blades to continue to turn due to inertia and allow the pilot and/or the software to act in autorotation mode.

10—considerable reduction in the weight of the vehicle by about 65/70% of a normal vehicle that does not benefit from the present invention, thus allowing this saving to be used in an increase in weight for batteries, fuel or passengers.

11—reduction in vehicle cost.

12—if it is desired to increase the power of the rotating mast 50, it is sufficient to increase the number of engines or adopt more powerful ones.

13—the invention is applicable both to two-blade and multiple-blade systems (tri-quadri-penta blade etc.) being placed on a vertical axis different from that of the blades.

14—the propulsion apparatus can also be used as a torque multiplier system as it can be powered with less energy to be used, even in non-aeronautical applications, i.e. for all those applications that can benefit from the leverage effect generated by pole 20 (example: battery recharging, production of energy from electric or endothermic rotary motion to the electric one, etc . . . ).

In essence, the invention also envisages the use of a propulsion apparatus 10 comprising a pole 20 mechanically connectable to a rotating mast, where at least one end of said pole 20 is equipped with a motor 30 configured to rotate the pole 20 in such a way that the rotation of said pole 20 can be used to rotate the rotating mast to generate or transmit energy to a user by exploiting the favorable lever effect.

It is important to underline that all the other vertical take-off aircraft proposed in the prior art, whether they are drones or personal transport systems with 3 or 4 fans or electric e-fans, are unlikely to be used for this task as it is impossible for them to perform "autorotation" and, secondly, the absorption of energy that 3 or 4 e-fans of adequate size have makes flights of more than 20-30 minutes unlikely.

In the context of the present invention it was calculated that a typical two-blades helicopter with blade diameter of 9.03 meters, 64 square meters of rotor surface, continuous power of 170 HP, maximum weight of 860 Kg at takeoff MTOW, has a weight of 500 Kg and 360 Kg of payload.

Subtracting from 500 Kg the weight of the Lycoming engine, the weight of the main rotor, the free wheel, the oil cooler, the tail rotor, the tail, the rear boat, the tank and of all it is no longer necessary, 368 Kg are subtracted so that the cell would weigh 132 Kg.

The additional weight consisting of the pole 20, made of carbon fiber, and the propulsion systems (e-fan or jet engine) is about 40 Kg in flight line.

By then using a structure for the cell, either in carbon fiber or glass fiber the overall weight of the aircraft (cell+propulsion system rotorengine) can be further reduced to less than 130 Kg.

So the weight saving is of 74% of the original weight and equal to 370 kg for the same payload.

Now it's just a question of how this advantage can be redistributed. For the invention system with fuel jet turbine, to the helicopter weight the fuel pump system, tank, fire bulkhead, steel fuel transmission manifold, and others must be added for a total weight of 35 Kg. This leads to a helicopter weight in line of flight of 165 Kg.

Electric Helicopter Examples

EXAMPLE 1

Example 1—Helicopter with Two Electric E-Fans—MTOW 860 Kg, 2 Passengers+Luggage

In this case, flight duration should be preferred by reducing the payload to 190 Kg and installing a lithium-ion battery pack of 540 Kg, equal to 135 kW/h.

The design of such a helicopter leads to a flight duration of 2.7 h at a cruising speed of 160 km/h with a range of 432 km.

EXAMPLE 2

Example 2—Helicopter with Two Electric E-Fans—MTOW 860 Kg 3 Passengers+Luggage

In this case, the flight duration must be preferred by reducing the payload to 270 Kg and installing a lithium-ion battery pack of 452 Kg equal to 113 kW/h.

The helicopter weight increases by 8 kg for the third passenger seat.

The design of such a helicopter leads to a flight duration of 2.26 h at a cruising speed of 160 km/h with a range of 361.6 km.

EXAMPLE 3

Example 3—Helicopter with Two Electric E-Fans—MTOW 860 Kg, 4 Passengers+Luggage

In this case the flight duration must be preferred by reducing the payload to 334 Kg and installing a lithium-ion battery pack of 380 Kg equal to 95 kW/h.

The helicopter weight increases by 16 kg for the third and fourth passenger seat.

The design of such a helicopter leads to a flight duration of 1.9 h at a cruising speed of 160 km/h with a range of 304 km.

Helicopter with Jet Engine Examples

EXAMPLE 4

Example 4—1 Jet Engine Helicopter—MTOW 860 Kg, 4 Passengers+Extra Baggage

In this case, the flight duration must be preferred, reducing the payload to 360 Kg and fuel consumption to 335 kg per hour of 90 kg. The design of such a helicopter leads to a flight duration of 3.72 h at a cruising speed of 160 km/h with a range of 595 km.

In general, the propulsion apparatus described can be used for both pilot and drones, i.e. aircraft not equipped with a pilot and controllable remotely or equipped with their own autonomous flight software.

In the case of drones, the propulsion apparatus of the invention offers them the possibility of carrying high loads and having long autonomy unlike the current drones.

Possible uses of such drones may be: agriculture, reconnaissance, aerial photography and cinematography and more.

Obviously, modifications or improvements can be made to the invention as described for contingent or particular reasons, without going beyond the scope of the invention as claimed below.

The invention claimed is:

1. A vertical take-off rotor wing aircraft provided with a propulsion apparatus, wherein said aircraft comprises a rotating mast configured to rotate said rotor wing, said propulsion apparatus consisting of a pole mechanically connectable to the rotating mast of the aircraft, electric turbines, and a battery that provides power to said electric turbines, the electric turbines being disposed respectively at ends of said pole, said pole being shaped to avoid creating a lift when put into rotation, wherein said electric turbines are configured to rotate the pole around an axis of the rotating mast in such a way that the rotation of the pole can be used to rotate the rotor wing and said electric turbines powered by the battery provide all the thrust necessary to vertically lift and propel forward the aircraft, wherein the rotor wing rotates in a rotor wing plane of rotation, wherein the pole rotates in a plane that is above the rotor wing plane of rotation, wherein said rotor wing is connected to said rotating mast by a steering system including a swash plate and oscillating system, and wherein a point of attachment of the pole to the rotating mast is disposed above the swash plate and oscillating system, and said aircraft further comprises two electric fans that are controllable to allow a rotation of the rotor wing aircraft up to 360° on the yaw axis, each of the two electric fans being mounted directly on a fuselage of said aircraft and configured to rotate around an axis that is perpendicular to a forward direction of motion of the rotor wing aircraft.

2. The vertical take-off rotor wing aircraft as in claim 1, wherein the pole is internally hollow to allow the passage of electrical conductors to the electric turbines.

3. The vertical take-off rotor wing aircraft as in claim 1, wherein the pole is mechanically connected to the rotating mast in an integral fashion by means of a rigid joint.

4. The vertical take-off rotor wing aircraft as in claim 1, wherein the pole is made of carbon fiber.

5. The vertical take-off rotor wing aircraft as in claim 1, wherein the two electric fans are controllable by use of pedals.

6. The vertical take-off rotor wing aircraft as in claim 1, wherein said battery is a lithium-ion battery pack, the lithium-ion battery pack being chosen from battery packs having a weight comprised between 380 kg to 540 kg.

7. The vertical take-off rotor wing aircraft as in claim 1, wherein said battery is a lithium-ion battery pack, the lithium-ion battery pack being chosen from battery packs having a power output comprised between 95 kW/h and 135 KW/h.

8. The vertical take-off rotor wing aircraft as in claim 1, wherein said electric turbines powered by the battery provide all the thrust necessary to vertically lift and propel forward the aircraft up to a cruising speed of at least 160 km/h.

* * * * *